(12) United States Patent
Ding et al.

(10) Patent No.: US 6,995,946 B2
(45) Date of Patent: Feb. 7, 2006

(54) TEMPERATURE COMPENSATION OF SEEK PROFILES IN DATA STORAGE DEVICES

(75) Inventors: Mingzhong Ding, Singapore (SG); KianSoon Yeo, Singapore (SG); JianYi Wang, Singapore (SG); KianKeong Ooi, Singapore (SG); BengWee Quak, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 145 days.

(21) Appl. No.: 10/608,046

(22) Filed: Jun. 27, 2003

(65) Prior Publication Data

US 2004/0264036 A1    Dec. 30, 2004

(51) Int. Cl.
    *G11B 5/55*       (2006.01)
(52) U.S. Cl. ................. 360/78.07; 360/78.09
(58) Field of Classification Search ............ 360/78.07, 360/75, 78.04, 78.06, 78.09; 318/561, 634
    See application file for complete search history.

(56) References Cited

U.S. PATENT DOCUMENTS

| | | | |
|---|---|---|---|
| 4,907,108 A | 3/1990 | Masuyama | 360/78.01 |
| 5,557,550 A | 9/1996 | Vigil et al. | 364/557 |
| 5,594,603 A * | 1/1997 | Mori et al. | 360/78.04 |
| 6,724,564 B1 * | 4/2004 | Codilian et al. | 360/78.07 |
| 6,731,453 B2 * | 5/2004 | Korbel et al. | 360/78.06 |
| 6,747,838 B2 * | 6/2004 | Korbel et al. | 360/78.06 |
| 6,754,035 B2 * | 6/2004 | Francis et al. | 360/78.06 |
| 6,791,785 B1 * | 9/2004 | Messenger et al. | 360/78.07 |
| 2002/0191328 A1 * | 12/2002 | Hamaguchi et al. | 360/78.04 |
| 2003/0048571 A1 * | 3/2003 | Soyama et al. | 360/78.06 |
| 2003/0179486 A1 * | 9/2003 | Ho et al. | 360/71 |

* cited by examiner

*Primary Examiner*—David Hudspeth
*Assistant Examiner*—James L. Habermehl
(74) *Attorney, Agent, or Firm*—Shumaker & Sieffert, P.A.

(57) ABSTRACT

Methods relating to compensating a pre-defined seek profile for use in a data storage device, such as a disc drive, to manage the internal temperature of the device are disclosed. One embodiment disclosed is related to determining a seek profile compensation value that can be used to compensate the pre-defined seek profile for temperature. Another embodiment is a method of using a seek profile compensation value during device operation to maintain the data storage device operating temperature below an operating temperature threshold. Yet another embodiment of the present invention may be thought of as a controller for a data storage device. The controller comprises a microprocessor having a pre-determined seek profile and a means for compensating the pre-determined seek profile based on a current operating temperature.

27 Claims, 10 Drawing Sheets

TEMPERATURE COMPENSATION OF SEEK PROFILES IN DATA STORAGE DEVICES

FIELD OF THE INVENTION

This application relates generally to data storage devices and more particularly to managing the temperature in a data storage device.

BACKGROUND OF THE INVENTION

In the production of data storage devices such as magnetic disc drives, production cost and performance must be constantly balanced and many design tradeoffs must be made. One such tradeoff in disc drives relates to the size of the servo power device for the voice coil motor (VCM) and the spindle motor. VCM moves the actuator over the discs in the disc drive while spindle motor is spinning. Smaller servo power device dies are less expensive and, thus, lower production cost. However, smaller die size may result in high resistance, which in turn increases the internal device temperature at a given running current for desired performance requirement, such as, access time and spindle speed, etc.

A power device internal temperature can severely affect the drive's performance. The power device can overheat causing drive operation error, such as seeking error, track following error, etc. To protect the power device from causing damage to itself by operating at too high a temperature, most power devices monitor the internal temperature and are designed to go into thermal shutdown if the temperature gets too high. A thermal shutdown is triggered by hardware when the internal temperature reaches a pre-defined threshold. In addition, temperature sensitivity is exacerbated when the ambient environment temperature is already very high as is now common in modern computers and electronics. When a thermal shutdown occurs, the VCM retracts the actuator. This will normally be followed by a spin down and spin up retry and will result in a severe error and dramatic performance drop.

Hardware means for reducing power dissipation may be used in the drive. However, these increase cost. Other methods for reducing power dissipation include introducing time delays between seeks, but these methods decrease drive performance.

Accordingly there is a need for an inexpensive method to reduce the power dissipation from a VCM. The present invention provides a solution to this and other problems, and offers other advantages over the prior art.

SUMMARY OF THE INVENTION

Against this backdrop the present invention has been developed. An embodiment of the present invention may be thought of as a method of compensating a pre-defined seek profile for use in a data storage device. The method comprises defining an operating temperature threshold at some specified location such as at a power device diode; performing one or more seek operations at each of a plurality of initial data storage device operating temperatures; and obtaining a seek profile compensation value for each of the plurality of initial data storage device operating temperatures sufficient to maintain the data storage device operating temperature as measured at the specified location below the operating temperature threshold.

Alternatively, an embodiment may be thought of as a method of performing a seek operation in a data storage device using a seek profile compensation value that compensates the pre-defined seek profile based on temperature. The method comprises determining a seek profile compensation value from seek profile compensation information based on a current operating temperature; compensating a pre-determined seek profile using the seek profile compensation value to create a temperature compensated seek profile; and performing the seek operation using the temperature compensated seek profile.

Yet another embodiment of the present invention may be thought of as a controller for a data storage device. The controller comprises a microprocessor having a pre-determined seek profile and a means for compensating the pre-determined seek profile based on a current operating temperature.

These and various other features as well as advantages which characterize the present invention will be apparent from a reading of the following detailed description and a review of the associated drawings.

DETAILED DESCRIPTION

Embodiments of the present invention will be discussed with reference to a magnetic disc drive. One skilled in the art will recognize that the present invention may also be applied to any data storage device, such as an optical disc drive, a magneto-optical disc drive, or a compact disc drive, that manages the power dissipation due to the movement of a movable sensing device such as a read head.

Figure 1:
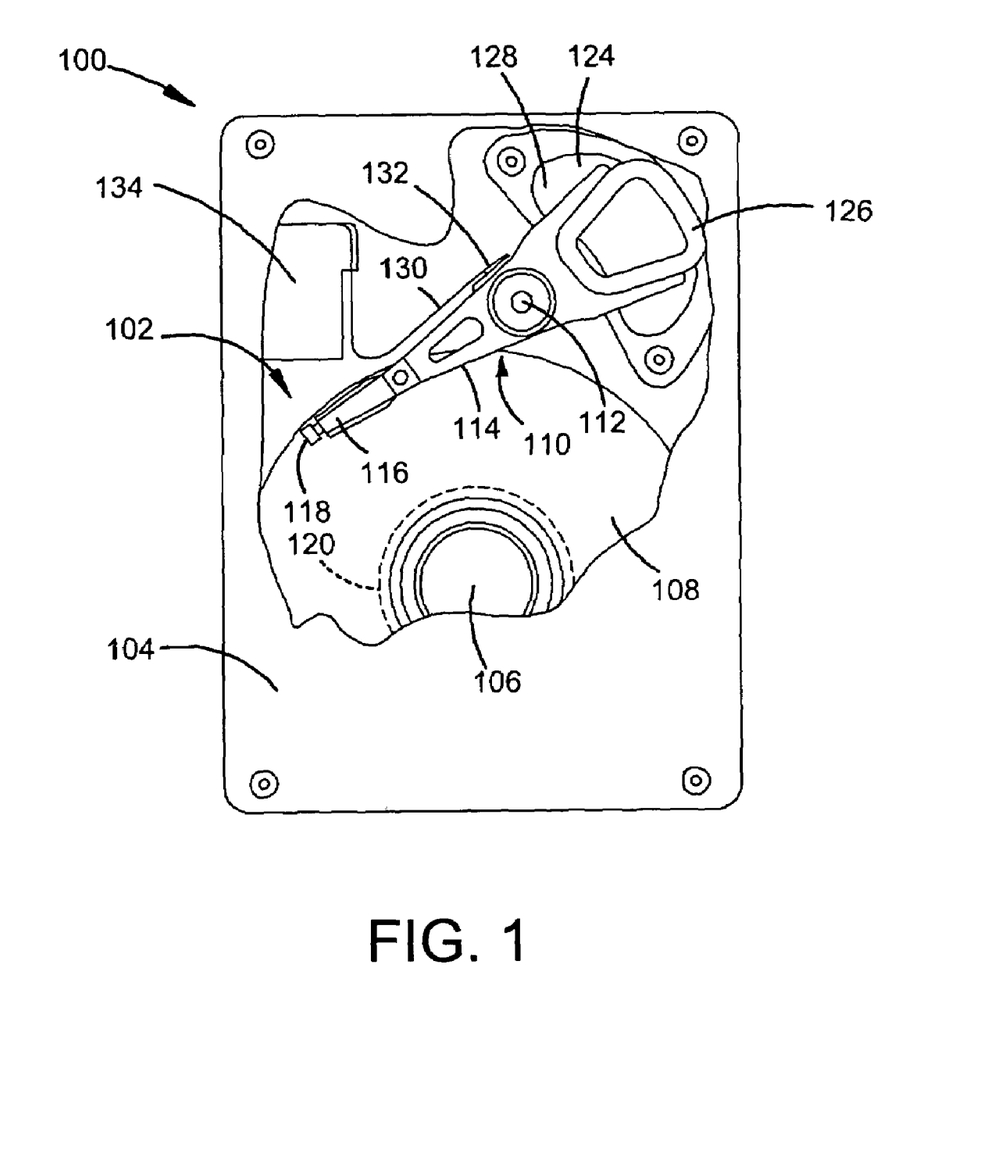
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 that includes an fluid bearing slider enabling the head 118 to fly in close proximity above the corresponding surface of the associated disc 108 as a result of its movement through the fluid atmosphere within the disc drive 100.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
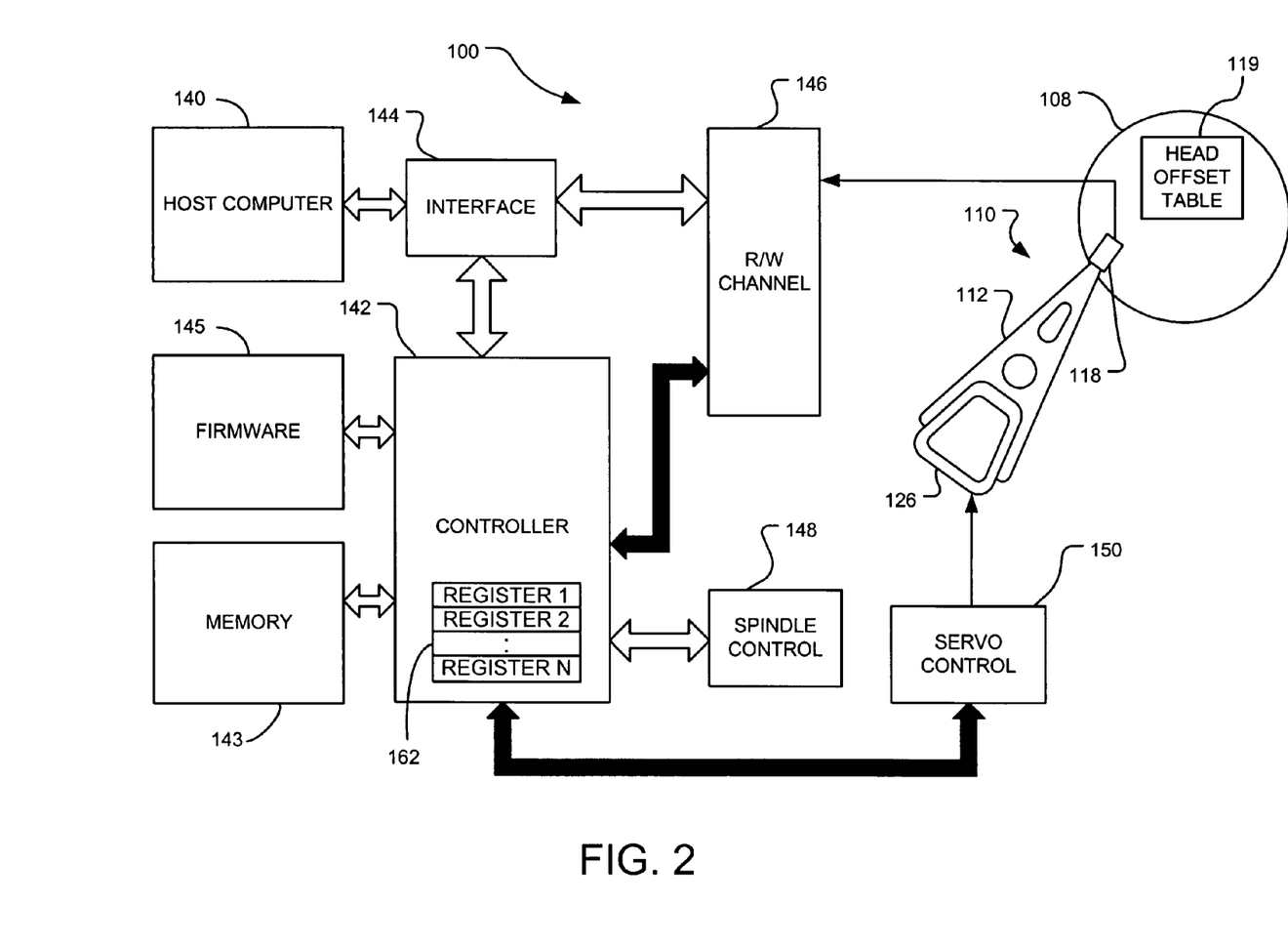
FIG. 2 is a flow chart of the software generator in accordance with a preferred embodiment of the present invention.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is operably connected to a host computer 140 in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle motor control circuit 148, which typically electrically commutates the spindle motor 106 (FIG. 1) through the use of back electromotive force (BEMF) sensing. During a seek operation, wherein the actuator 110 moves the heads 118 between tracks, the position of the heads 118 is controlled through the application of current to the coil 126 of the voice coil motor 124. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor coil 126, thereby causing the actuator assembly 110 to be pivoted. This velocity profile is often referred to as the seek profile.

Data is transferred between the host computer 140 or other device and the disc drive 100 by way of an interface 144, which typically includes a buffer to facilitate high-speed data transfer between the host computer 140 or other device and the disc drive 100. Data to be written to the disc drive 100 is thus passed from the host computer 140 to the interface 144 and then to a read/write channel 146, which encodes and serializes the data and provides the requisite write current signals to the heads 118. To retrieve data that has been previously stored in the disc drive 100, read signals are generated by the heads 118 and provided to the read/write channel 146, which performs decoding and error detection and correction operations and outputs the retrieved data to the interface 144 for subsequent transfer to the host computer 140 or other device. Such operations of the disc drive 100 are well known in the art and are discussed, for example, in U.S. Pat. No. 5,276,662 issued Jan. 4, 1994 to Shaver et al.

As discussed in the background, power consumption by the VCM/Spindle can cause an internal rise in the temperature of the power device resulting in decreased performance. During drive operation, VCMs are in one of two modes: seeking and track following. Track following requires relatively little current and, thus, consumes relatively little power. Power devices can operate in a steady state of track following without overheating, as the power consumed can be easily dissipated by the power device.

Seeking, on the other hand, consumes a greater amount of power. Seeking, depending on the length of the seek, may involve three distinct phases: acceleration, coasting, and deceleration. During acceleration, current is applied to the VCM to accelerate the armature and increase the speed of the read/write head. If the distance of the seek is large, a maximum velocity may be achieved and the VCM will go into a low current, low power coast mode. When the read/write head approaches the target track, a deceleration mode is entered where the armature speed is reduced to zero at the target track location by applying a reverse current to the VCM. The amount of time spent in the different modes and the currents applied are dictated by the seek profile.

An investigation of the power consumption during seeking indicates that consumption is relatively high during the acceleration and deceleration modes. Power consumption during coasting is similar to that experienced in track following mode.

Figure 3:
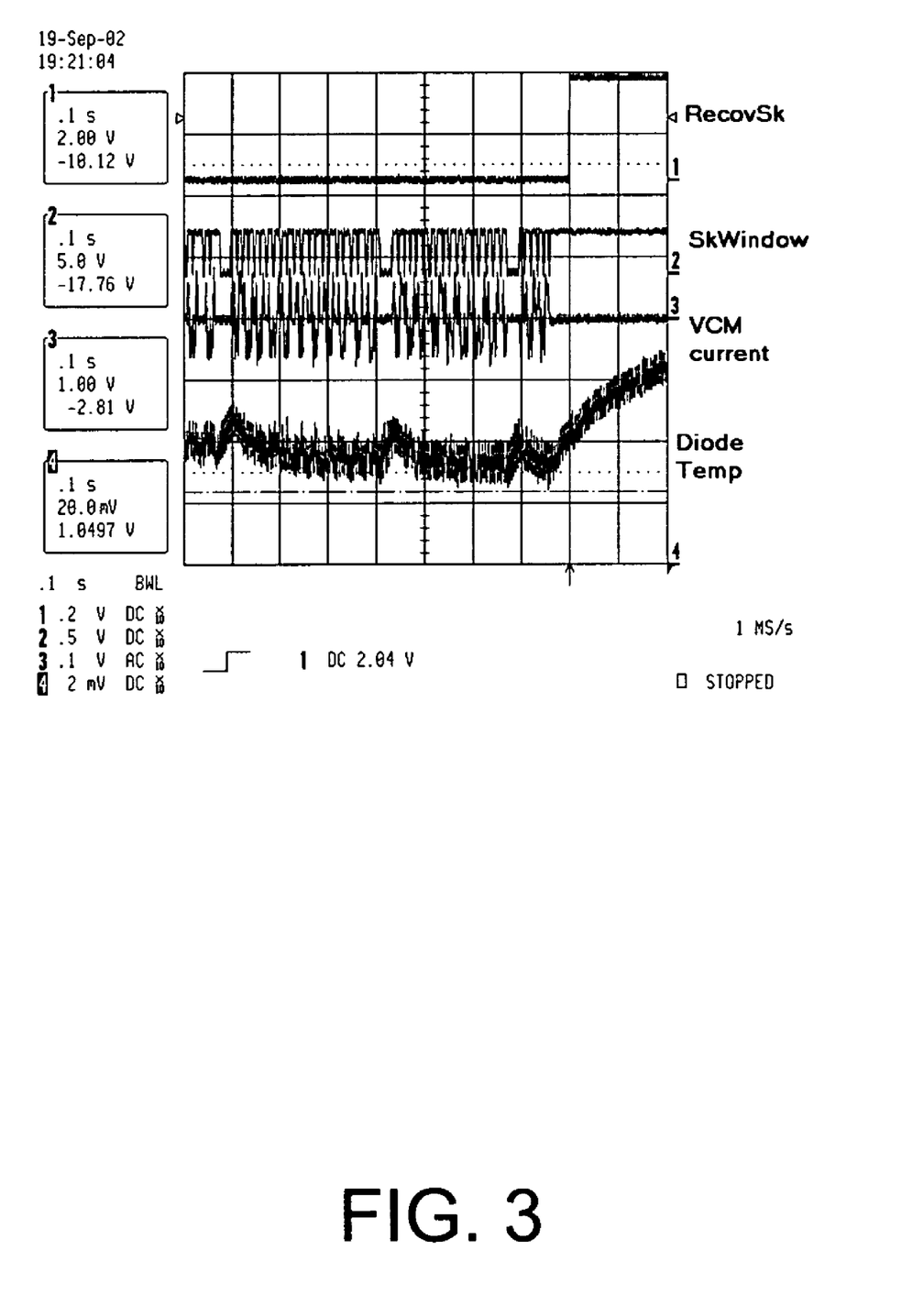
FIG. 3 presents data observed in a disc drive during seeking and following showing temperature and current changes during an exemplary thermal shutdown.
Figure 4:
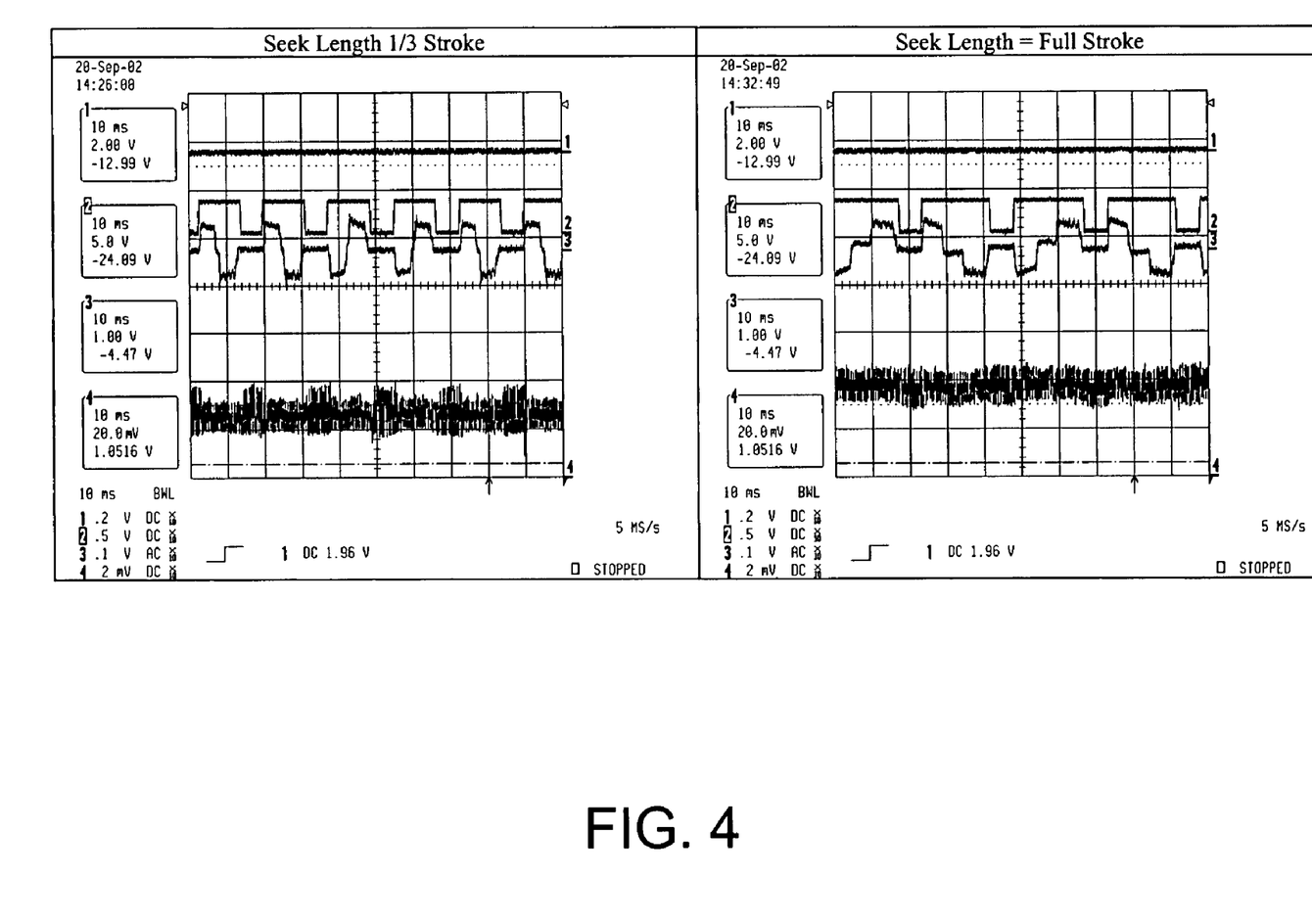
FIG. 4 presents data observed in a disc drive during seeking and following showing temperature and current changes during seeks of different lengths.
Figure 5:
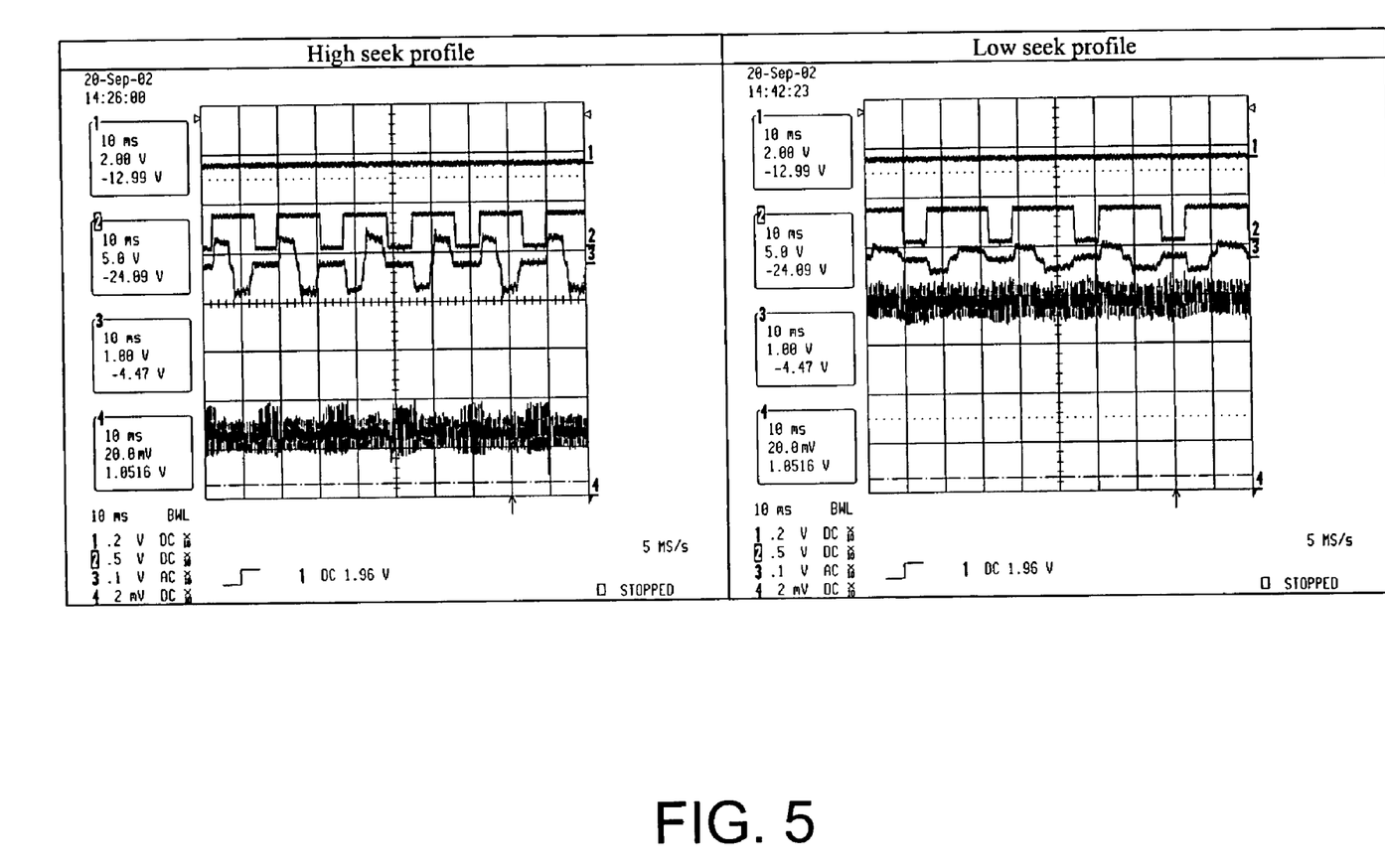
FIG. 5 presents data observed in a disc drive during seeking and following showing temperature and current changes for seeks of the same length but using different seek profiles.

FIGS. 3–5 present data observed in a disc drive during seeking and following. The data is presented in graphs of four signals measured from an exemplary disc drive versus time. The top graph, referred to as channel 1 or Ch1 for short, is the RecovSeek signal indicating a seeking problem happens. When the RecovSeek signal is high, a thermal shutdown has occurred. Ch2 shows the seeking operation signal, SkWindow. When the SkWindow signal is high, the drive is seeking. Ch3 shows the VCM current during seeking. Note that this signal has a low and high current component for each seek because of the acceleration/deceleration modes. Ch4 shows a thermal signal, or diode temperature, which is the temperature measurement inside a power device. Note that in Ch4, the diode signal is low when the temperature is high.

FIG. 3 shows a thermal shutdown example. In the exemplary disc drive used, the thermal shutdown threshold is set at 1.05 volts (V), i.e., if the temperature signal drops below 1.05V the drive goes into a thermal shutdown. As shown in FIG. 3, numerous seeks are performed until the temperature signal drops below 1.05V and a thermal shutdown is triggered. Although a seeking window opens, the seeking operation is not started since the VCM actually goes to retract mode. A software 40 ms seek timeout was triggered and a RecoveSeek window asserts. FIG. 3 also shows the temperature signal level varies with the VCM currents, as expected. During track following mode, there is less power consumption. The temperature signal level is higher than thermal shutdown (indicating a lower temperature).

FIG. 4 shows data for a ⅓ stroke seeking operation and a full stroke seeking indicating that the effect on temperature depends on different seek length. For the ⅓ stroke seeking operation, since there is no coasting between acceleration and deceleration in VCM current, the thermal signal is lower than that of a full stroke seeking operation, where a coast state exists.

FIG. 5 shows data comparing a high seek profile (where a high VCM current is used for acceleration and deceleration which reduced seek time) is compared to a low seek profile (where a low VCM current is used) for ⅓ stroke seeks. FIG. 5 shows that the absolute temperature is greatly dependent on the VCM current used. For high seek profile, high VCM current is needed and the steady-state temperature is higher, i.e., the diode signal is lower.

From FIGS. 3–5, we note that the thermal signal level is not a function of instantaneous VCM current i(t). Rather, it is a function of VCM power density (under assumption that spindle power consumption is consistent, which is always true since spindle speed is consistent during normal disk drive operations.). A VCM power density $\overline{P}_d$ can be defined as:

$$\overline{P}_d = \frac{1}{t_2 - t_1} \int_{t_1}^{t_2} i^2(t) \cdot R_{ds} dt \quad (1)$$

where t is time, $t_1$ and $t_2$ are two times, i(t) is the VCM current as function of time, $\Delta t = t_2 - t_1$ is a time interval to calculate VCM power density, and $R_{ds}$ is the resistance of the VCM driver FET inside the power device.

Figure 6:
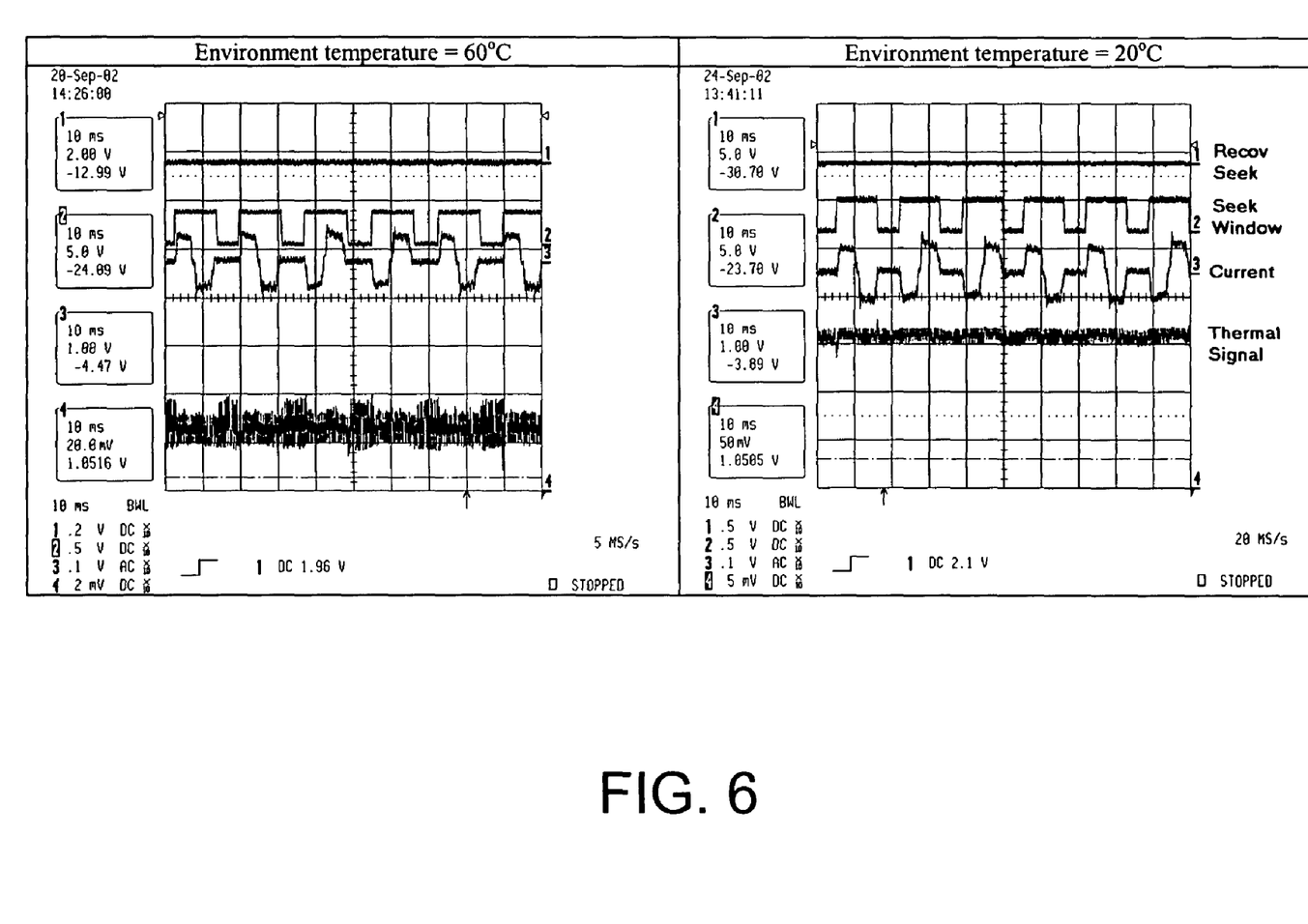
FIG. 6 presents data observed in a disc drive during seeking and following showing temperature and current changes during seeks performed at different environmental temperatures.

Thermal shutdown occurs when the power device internal temperature goes above a pre-defined absolute threshold. Thus, the ambient temperature in which the drive is operated is also a factor in determining how much power can be consumed by the power device before the threshold is crossed. This is illustrated in FIG. 6, where data is compared with a drive operating in a high temperature, 60 degrees Celsius (° C.) environment and a low temperature, 20° C., environment. Note that the steady-state temperature is lower in the low temperature environment.

Embodiments of the present invention adjust the seek profile used by the disc drive to reduce the power density sufficiently to maintain the power device internal temperature below its temperature threshold. The adjustment is achieved through the use of a compensation factor $\beta_{thermal}$ which is multiplied with the pre-determined seek profile stored in the disc drive. Such compensation factors are known in the art. For example, a similar compensation factor $\beta_{AAM}$ is often used as part of Automatic Acoustic Management (AAM) in disc drives. During operation of disc drives embodying the present invention, the pre-determined seek profile may be multiplied by $\beta_{thermal}$ to obtain a seek profile that reduces the power density sufficiently to maintain the power device internal temperature below its temperature threshold.

The power device internal operating temperature threshold is defined by the disc drive manufacturer and does not necessarily have to be the same temperature at which the power device thermal shutdown occurs. For example, the temperature threshold may be selected to allow for a margin of safety from the shutdown temperature to account for variations in the physical characteristics between power devices. In embodiments, a 10° C. temperature margin is used, i.e., the power device internal operating temperature threshold is 10° C. below its thermal shutdown temperature defined by the chip manufacturer.

The compensation factor $\beta_{thermal}$, or $\beta$ for short, can be determined by several methods.

Figure 7:
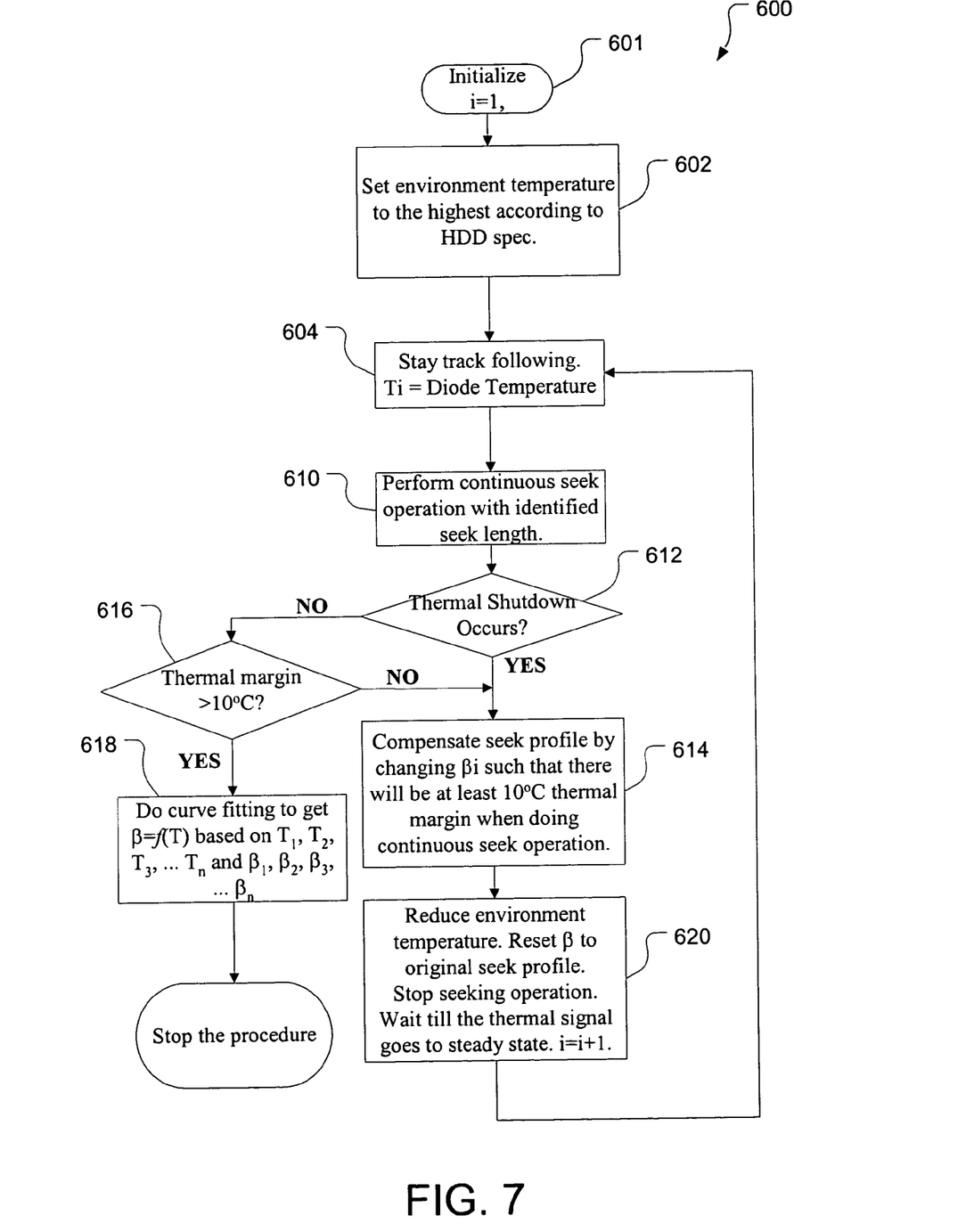
FIG. 7 is a flow chart of a method for determining a seek profile compensation value for compensating a pre-defined seek profile for operating temperature in accordance with a preferred embodiment of the present invention.

FIG. 7 presents one embodiment of a method 600 of determining a seek profile compensation factor as a function of starting, or initial, internal power device temperature for use in compensating a pre-defined seek profile. One skilled in the art will recognize that the temperature measurement used when compensating the seek profile does not necessarily have to be the power device temperature. The method 600 could also easily be adapted to using temperature measurements from other locations within the disc drive. However, for the balance of the written description, references to temperatures should be taken as references to the power device temperature measured by a diode.

The method 600 starts with an initialization operation 601. In the initialization operation 601, the operating temperature threshold and seek length to be used when calculating the compensation factor $\beta$ are defined, determined or otherwise selected by the manufacturer, for example as described above. In one embodiment, the seek length is selected as that seek length that has the highest power density. The initialization operation 601 also sets a counter, i, to 1 and initializes the compensation value $\beta$ to 1.

Next, the temperature of the disc drive is controlled by adjusting the ambient environment temperature. After initialization operation 601, the environment temperature outside the drive is set to the highest specified disc drive operating environment temperature and allowed to equilibrate in a temperature setting operation 602. One skilled in the art will recognize that one need not start at this temperature or even test at this exact temperature to determine a correction factor. This operation is performed to easily test the disc drive at different temperatures. Other methods may be used to vary the temperature within the drive including operating the drive until a desired power device internal operating temperature is reached.

After the temperature setting operation 602, the drive enters into a track following mode and further allowed to equilibrate at to an operating temperature in a track following operation 604. Once a steady state internal operating temperature is achieved, the track following operation records the operating temperature in the drive as $T_i$ based on the current value of the counter i. $T_i$ can be considered an initial power device operating temperature.

After $T_i$ is determined, a seek operation 610 begins performing multiple seeks of the length determined in the initialize operation 601. In embodiments, seeks are performed until either the drive goes into thermal shutdown or the internal operating temperature of the power device reaches a steady state value below the shutdown temperature. Many different methods may be used to determine when the internal operating temperature reaches a steady state value and such methods are well known in the art.

If a thermal shutdown occurs a first determination operation 612 transfers control to a compensation operation 614. If, instead, a steady state operating temperature below the shutdown temperature is reached, the first determination operation 612 transfers control to a second determination operation 616 that determines if the steady state operating temperature is less than the defined operating temperature threshold.

If the steady state operating temperature is greater than the operating threshold (in the embodiment shown, 10° C. below the shutdown temperature), the second determination operation 616 passes control to a compensation operation 614. If the steady state operating temperature is equal to or less than the operating threshold (in the embodiment shown, 10° C. below the shutdown temperature), the second determination operation 616 passes control to a calculation operation 618 discussed below.

Compensation operation 614 adjusts the seek profile by iteratively changing the seek profile compensation factor $\beta$ and allowing the operating temperature to equilibrate and come to a steady state. This is done until a value for $\beta_i$ is obtained that compensates the seek profile sufficiently to maintain the operating temperature at or below the operating temperature threshold. Once this value is determined, it is stored as $\beta_i$. The seek profile compensation value $\beta_i$ may be stored in the device being tested, in a testing device, or both as necessary for the method in which the values are to be used during later operation of the disc drive. Any statistical method may be used to change the values of $\beta_i$ for each iteration to quickly determine the appropriate value of $\beta_i$ such as interpolation, Runge Cutta, etc. Such methods are well known in the art.

After the value of $\beta_i$ is stored by compensation operation 614, a temperature reduction operation 620 reduces the environment temperature by some specified amount and allows it to come to equilibrium. In addition, the compensation factor $\beta$ is reinitialized to 1 and the value of the counter i is incremented by 1. Control is then passed back to the track following operation 604 to allow the disc drive, including the power device, to come to a steady state operating temperature at the new environment temperature. Thus, the method 600 is repeated until the desired range of temperatures is tested and values of $\beta_i$ are obtained for each initial operating temperature tested.

As mentioned above, if the second determination operation 616 determines that the steady state operating temperature is equal to or less than the operating threshold (in the embodiment shown, 10° C. below the shutdown temperature), the second determination operation 616 passes control to a calculation operation 618. This will occur when there is no longer any need to compensate the seek profile to maintain the internal power device operating temperature below the threshold.

By starting at the highest environment temperature and performing continuous seeks with the highest power density, the first test will be a worst-case operating scenario. If the steady state power device operating temperature is less than the defined operating threshold on this worst-case scenario, then there is no need to compensate that particular drive for temperature effects. Similarly, the method 600 spends less time determining the seek profile compensation values for drives that are less susceptible to temperature effects.

Calculation operation 618, depending on the embodiment, can perform many different operations. In one embodiment, calculation operation 618 stores a table of $\beta_i$ and $T_i$ values obtained during the method 600 in the disc drive. These raw seek profile compensation values may then be used by the disc drive to compensate the seek profile during subsequent operation.

In another embodiment, the calculation operation 618 determines a seek profile compensation function $\beta(T)$ based on the $\beta_i$ and $T_i$ values obtained during the method 600. This function may then be stored in the disc drive to be used by the drive to compensate the seek profile during subsequent operation. For example, in one embodiment the $\beta_i$ and $T_i$ values obtained during the method 600 are fitted to a curve describing the function $\beta(T)$. Such curve fitting techniques are well known in the art and any appropriate technique may be used. In this embodiment, the variables determined as part of the curve fitting calculation are subsequently stored in the disc drive to be used by the drive to compensate the seek profile during subsequent operation.

In an alternative embodiment, calculation operation 618 determines two seek profile compensation values, a first seek profile compensation value $\beta_1$, and a second seek profile compensation value $\beta_2$ from the $\beta_i$ and $T_i$ values obtained during the method 600. Each $\beta$ value is then associated an operating temperature range R. The two operating temperature ranges may be predetermined by the drive manufacturer or may be determined based on the $\beta_i$ and $T_i$ values obtained. The first seek profile compensation value $\beta_1$ and the second seek profile compensation value $\beta_2$ are then stored in the disc drive to be used during subsequent operation. Depending on which range, $R_1$ or $R_2$, the current internal operating temperature is at the beginning of a seek, the drive then selects the associated compensation value.

Figure 8:
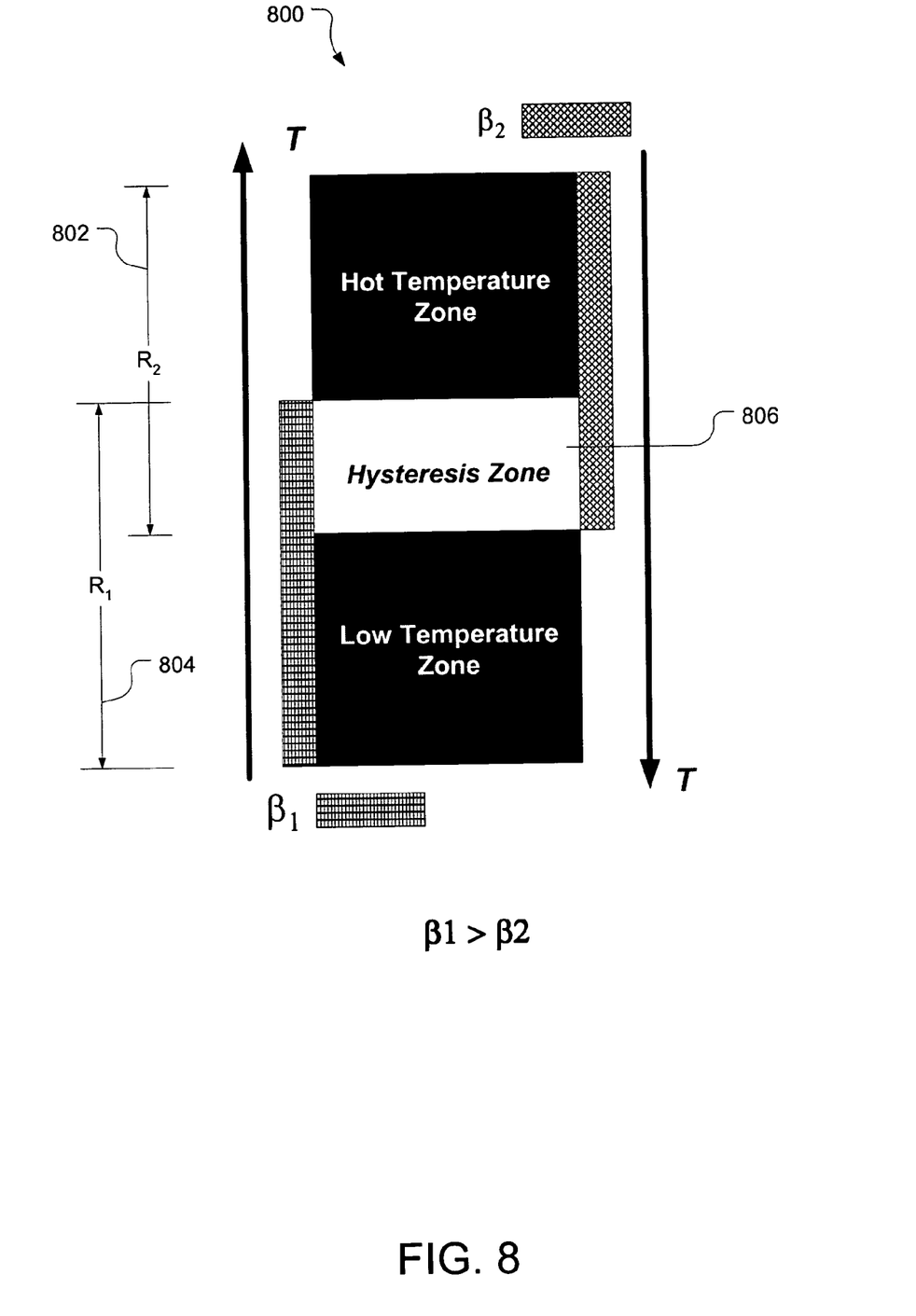
FIG. 8 is a graphical representation of two seek profile compensation values and associated temperature ranges and when the different values may be used by a data storage device to compensate a pre-defined seek profile for current operating temperature.

FIG. 8 graphically illustrates an example 800 of two such seek profile compensation values and associated temperature ranges. FIG. 8 shows a first temperature range $R_1$ 804 associated with a first seek profile compensation value $\beta_1$, and a second temperature range $R_2$ 802 associated with a second seek profile compensation value $\beta_2$. When the current operating temperature is within the temperature range $R_1$ 804, the seek profile compensation value $\beta_1$ is used to compensate the pre-determined seek profile for temperature. Likewise, when the current power device operating temperature is within the temperature range $R_2$ 802, the seek profile compensation value $\beta_2$ is used to compensate the pre-determined seek profile for temperature.

The example 800 shown in FIG. 8 further includes a hysteresis zone 806 where the temperature ranges overlap. In embodiments with hysteresis zones 806, the current operating temperature may be simultaneously within both zones. In that case, the compensation value chosen is determined by the recent changes in the operating temperature of the disc drive. For example, if the operating temperature has recently been falling, then the more aggressive, i.e., higher seek profile compensation value-in this case $\beta_1$, is used. If the operating temperature has been recently rising, then the lower, more conservative, seek profile compensation value normally used for high temperature zone is used.

In yet another embodiment, a second variable in addition to the power device operating temperature is used to determine the seek profile compensation value. The second variable is the seek length of the seek to be performed. As discussed above, seeks of different length result in different amounts of heat generation and thus affect the internal operating temperature differently. In the method 600 described above, this was accounted for by using the most heat generating seek length as the seek length in the seek operation 610. Clearly, this results in a simpler one-variable seek profile compensation function $\beta(T)$ at the expense of performance, as the seek being performed may be short and thus produce less heat that assumed in the method 600.

Figure 9:
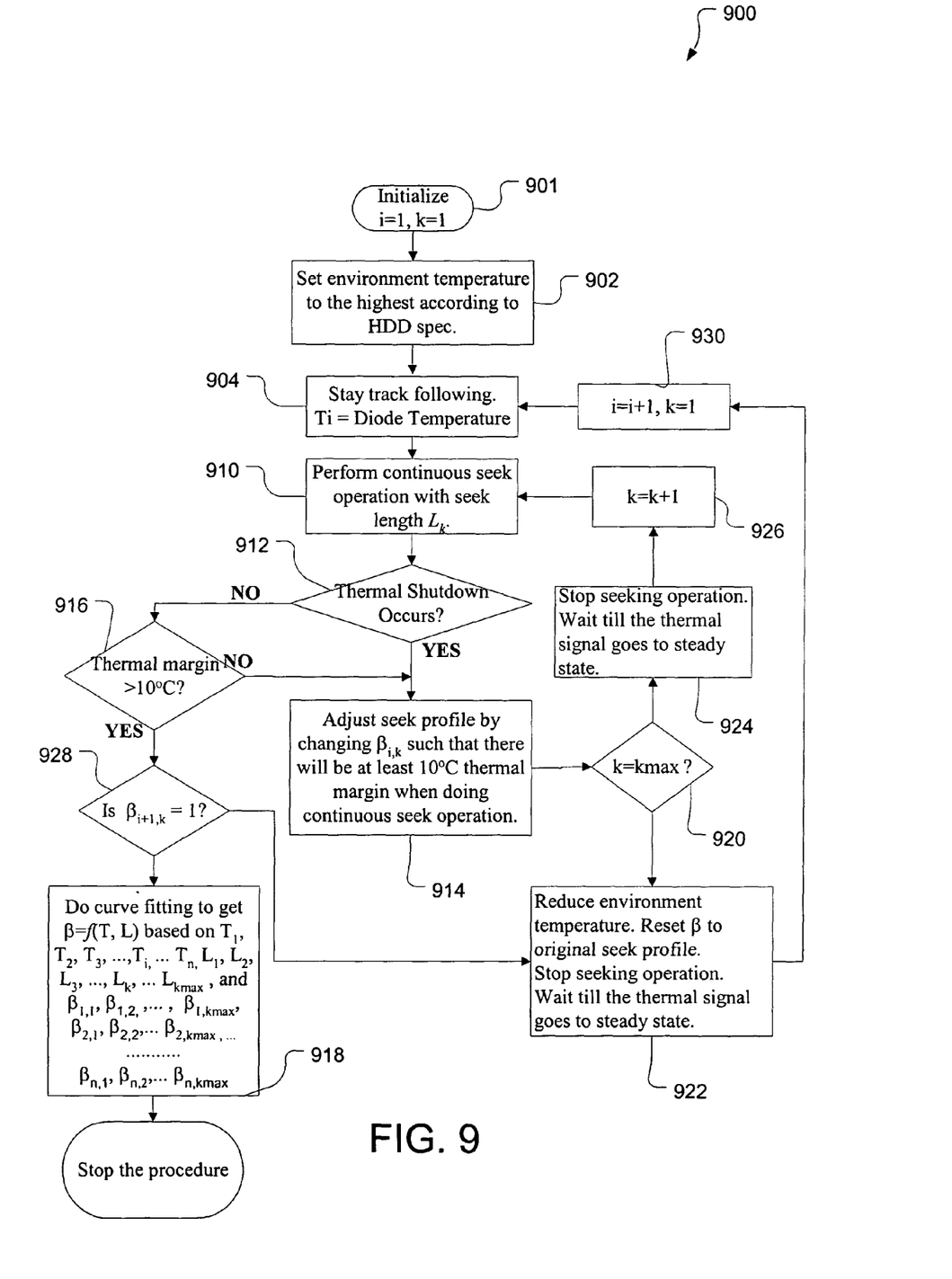
FIG. 9 is a flow chart of a method for determining a seek profile compensation value for compensating a pre-defined seek profile for operating temperature and seek length in accordance with a preferred embodiment of the present invention.

FIG. 9 presents one embodiment of a method 900 of determining a seek profile compensation factor as a function of current power device temperature and seek length for use in compensating a pre-defined seek profile. FIG. 9 is very similar to FIG. 7 except that it now introduces iterations at different seek lengths as well as iterations at different temperatures.

The method 900 begins with an initialization operation 901. In the initialization operation 901, the operating temperature threshold and seek lengths to be used when calculating the compensation factor thermal are defined, determined or otherwise selected by the manufacturer, for example as described above. Multiple seek lengths will be defined as $L_1, L_2, \ldots, L_k, \ldots, L_{kmax}$. The initialization operation 901 also sets two counters, i for the temperature index and k for the seek length index, to 1 and initializes all the compensation value $\beta_{i,k}$ to 1.

Next, the temperature of the disc drive is controlled by adjusting the ambient environment temperature. After initialization operation 901, the environment temperature outside the drive is set to the highest specified disc drive operating environment temperature and allowed to equilibrate in a temperature setting operation 902. One skilled in the art will recognize that one need not start at this temperature or even test at this exact temperature to determine a correction factor. This operation is performed to easily test the disc drive and power device at different temperatures. Other methods may be used to vary the temperature within the drive including operating the drive until a desired internal power device operating temperature is reached.

After the temperature setting operation 902, the drive enters into a track following mode and further allowed to equilibrate at to an operating temperature in a track following operation 904. Once a steady state internal operating temperature is achieved, the track following operation records the power device operating temperature in the drive as $T_i$ based on the current value of the counter i. $T_i$ can be considered an initial operating temperature.

After $T_i$ is determined, a seek operation 910 begins performing multiple seeks of the length $L_k$ identified by the current number k (as determined in the initialize operation 901). In embodiments, seeks of this length, $L_k$, are performed until either the drive goes into thermal shutdown or the internal operating temperature of the power device reaches a steady state value below the shutdown temperature. Many different methods may be used to determine when the internal operating temperature reaches a steady state value and such methods are well known in the art.

If a thermal shutdown occurs a first determination operation 912 transfers control to a compensation operation 914.

If, instead, a steady state operating temperature below the shutdown temperature is reached, the first determination operation 912 transfers control to a second determination operation 916 that determines if the steady state operating temperature is less than the defined operating temperature threshold.

If the steady state operating temperature is greater than the operating threshold (in the embodiment shown, 10° C. below the shutdown temperature), the second determination operation 916 passes control to the compensation operation 914. If the steady state operating temperature is equal to or less than the operating threshold (in the embodiment shown, 10° C. below the shutdown temperature), the second determination operation 916 passes control to a fourth determination operation 928 as discussed below.

Compensation operation 914 adjusts the seek profile by iteratively changing the seek profile compensation factor $\beta$ and allowing the operating temperature to equilibrate and come to a steady state. This is done until a value for $\beta_{i,k}$ is obtained that compensates the seek profile sufficiently to maintain the power device operating temperature at or below the operating temperature threshold. Once this value is determined, it is stored as $\beta_{i,k}$. The seek profile compensation value $\beta_{i,k}$ may be stored in the device being tested, in a testing device, or both as necessary for the method in which the values are to be used during later operation of the disc drive. Any statistical method may be used to change the values of $\beta_{i,k}$ for each iteration to quickly determine the appropriate value of $\beta_{i,k}$ such as interpolation, Runge Cutta, etc. Such methods are well known in the art.

After the value of $\beta_{i,k}$ is stored by compensation operation 914, a third determination operation 920 determines if all of the different seek lengths have been tested by comparing the current value of the counter k, with a value $k_{max}$ that is the number of seek lengths to be evaluated. The value $k_{max}$ is determined as part of the initiation operation 901. If k is equal to $k_{max}$, then control passes to a temperature reduction operation 922. If k is less than $k_{max}$, then more seek lengths need to be evaluated and control passes to equilibrate operation 924.

Equilibrate operation 924 stops the seeking by placing the drive in track following mode and allows the drive, including the power device, to come to a steady state temperature. Note that as the environment temperature has not been changed, this temperature should be $T_i$ as determined in the last track following operation 904. Once $T_i$ is achieved, an iteration operation 926 iterates the counter k, and then control passes back to seek operation 910. As k has been iterated, seek operation 910 will perform seeks at the new length. Thus, the method 900 repeats at $T_i$ until all the seek lengths have been tested.

As mentioned above, if k is equal to $k_{max}$, then control passes to the temperature reduction operation 922. Temperature reduction operation 922 reduces the environment temperature by some specified amount (as determined in the initiation operation 901) and allows the disc drive temperature, including the power device, to come to equilibrium. Next, control passes to a second iteration operation 930 in which the value of the counter i is incremented by 1 and k is reset to 1. Control is then passed back to the track following operation 904 to allow the disc drive to come to a steady state operating temperature at the new environment temperature. Thus, the method 900 is repeated until the desired range of temperatures is tested and values of $\beta_{i,k}$ are obtained for each initial operating temperature and for each seek length.

As mentioned above, if the second determination operation 916 determines that the steady state operating temperature is equal to or less than the operating threshold (in the embodiment shown, 10° C. below the shutdown temperature), the second determination operation 916 passes control to a fourth determination operation 928 that that checks to see if the seek profile compensation value $\beta_{i+1,k}$ at the last temperature $T_{i+1}$ is equal to 1 indicating that no temperature adjustment was necessary. If $\beta_{i+1,k}$ does not equal 1, then control passes to temperature reduction operation 922 and the method 900 repeats. If $\beta_{i+1,k}$ does equal 1, then it is likely that the remaining temperatures and seek lengths to be tested will also need no compensation to the seek profile to maintain the operating temperature below the operating temperature threshold and control is transferred to a calculation operation 918. Note that since all values of $\beta_{i,k}$ are set to 1 as part of the initiation operation 901, any untested $\beta_{i,k}$ values will be equal to 1.

By starting at the highest environment temperature and performing continuous seeks with the highest power density, the first test will be a worst-case operating scenario. If the steady state power device operating temperature is less than the defined operating threshold on this worst-case scenario, then there is no need to compensate that particular drive for temperature effects. Similarly, the method 900 spends less time determining the seek profile compensation values for drives that are less susceptible to temperature effects. In alternative embodiments, different conditions are used to determine whether to repeat the method 900 at different seek lengths and temperatures or end the testing and calculate the function based on the gathered information.

Calculation operation 918, depending on the embodiment, can perform many different operations. In one embodiment, calculation operation 918 stores a table of $\beta_{i,k}$, $L_k$ and $T_i$ values obtained during the method 900 in the disc drive. These raw seek profile compensation values may then be used by the disc drive to compensate the seek profile during subsequent operation.

In another embodiment, the calculation operation 918 determines a seek profile compensation function $\beta(T, L)$ based on the $\beta_{i,k}$, $L_k$ and $T_i$ values obtained during the method 900. This function may then be stored in the disc drive to be used by the drive to compensate the seek profile during subsequent operation. For example, in one embodiment the $\beta_{i,k}$, $L_k$ and $T_i$ values obtained during the method 900 are fitted to a curve (actually a surface as the curve will have three dimensions) describing the function $\beta(T,L)$. Such surface fitting techniques are well known in the art and any appropriate technique may be used. In this embodiment, the variables determined as part of the surface fitting calculation are subsequently stored in the disc drive to be used by the drive to compensate the seek profile during subsequent operation.

Figure 10:
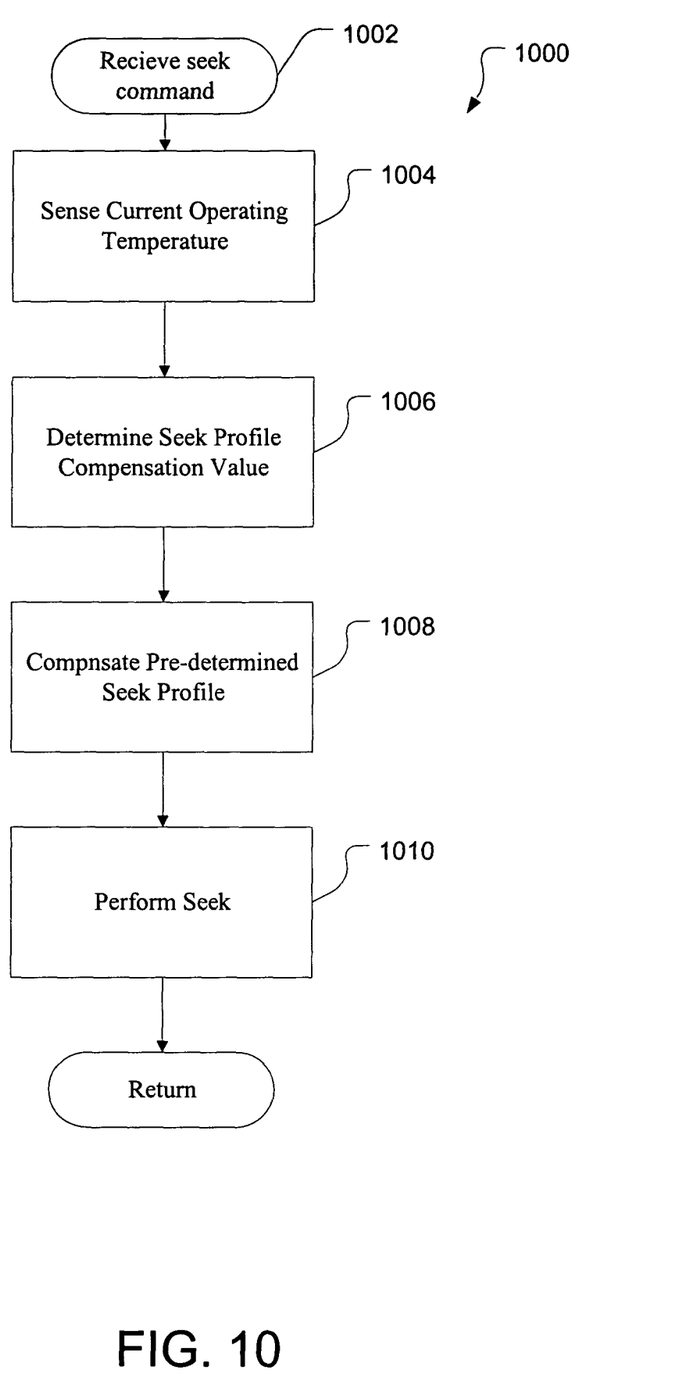
FIG. 10 is a flow chart of a method for performing a seek in a data storage device in accordance with a preferred embodiment of the present invention.

Turning now to FIG. 10, one embodiment of a method of using a seek profile compensation value $\beta$ when performing a seek in a data storage device is presented. The method 1000 will be discussed in the context of a disc drive, but the reader will understand that it can be equally applied to any type of data storage device.

The method 1000 begins with the receipt of a command to perform a seek in the disc drive in receiving operation 1002. Next, a temperature sensing operation 1004 obtains the current operating temperature of the drive. The temperature measured should be the same that was used for determining the compensation values. For example, if the power device diode was used as described above, then the same diode should be used for monitoring the operational temperature. Control then passes to a determining operation 1006 that determines a seek profile compensation value $\beta$ from information stored in the disc drive based on the current operating temperature.

The information stored may be in the form of a mathematical function, in the form of a look up table or in some other form. If in the form of a function, the seek profile compensation value must be calculated using the current temperature. If in the form of a lookup, the seek profile compensation value may be selected as the value associated with the closest temperature in the table to the current temperature. Another way of using a lookup table would be to interpolate between the compensation values based on the current temperature. Many variations of using a lookup table will be immediately suggested to those in the art. Other forms of information will also suggest themselves to those in the art. For example, an equation could be built into the operating code and variables for use in the equation describing the function may be stored in the drive.

After the seek profile compensation value is determined, a compensation operation 1008 retrieves the pre-determined seek profile for the drive and compensates it for temperature using the seek profile compensation value. Compensation could take many forms based on the format of the seek profile and information stored. For example, the compensation value may be multiplied with the seek profile to obtain a compensated seek profile. In another embodiment, the seek profile may be divided by the seek profile compensation factor. Many other methods for effecting the compensation will immediately suggest themselves to those in the art. Any such methods may be used here as long as the result is a seek profile compensated for the current operating temperature.

After the temperature compensated seek profile is determined in compensation operation 1008, perform seek operation 1010 performs the seek as instructed in the receiving operation 1002 using the temperature compensated seek profile and then control is returned.

Other embodiments of the method 1000 are also possible. For example, if the seek profile compensation value is a function of the current power device operating temperature and seek length, as described in with reference to FIG. 9, then determine seek profile compensation value operation 1006 will determine a value based on both the current operating temperature and the seek length of the seek command received in receiving operation 1002.

Another embodiment adapts the method 1000 for using the two seek profile compensation values described with reference to FIG. 8. In the embodiment, the recent changes in operating temperatures are monitored and the seek profile compensation value is determined based what temperature range the current operating temperature is in and the recent changes in operating temperature.

In yet another embodiment, the method 1000 is adapted for use with one or more addition compensation values, such as the AAM compensation value. In the embodiment, the AAM compensation value is determined along with the seek profile compensation value that is based on the current operating temperature. These two values are compared and the value that represents the most compensation of the seek profile is used. Thus insuring that the seek profile will always be at least temperature compensated.

In summary, an embodiment of the present invention may be thought of as a method of compensating a pre-defined seek profile for use in a data storage device. The method comprises defining an operating temperature threshold; performing one or more seek operations at each of a plurality of initial data storage device operating temperatures; and obtaining a seek profile compensation value for each of the plurality of initial data storage device operating temperatures sufficient to maintain the data storage device operating temperature below the operating temperature threshold.

Alternatively, an embodiment may be thought of as a method of performing a seek operation in a data storage device. The method comprises determining a seek profile compensation value from seek profile compensation information based on a current operating temperature; compensating a pre-determined seek profile using the seek profile compensation value to create a temperature compensated seek profile; and performing the seek operation using the temperature compensated seek profile.

Yet another embodiment of the present invention may be thought of as a controller for a data storage device. The controller comprises a microprocessor having a pre-determined seek profile and a means for compensating the pre-determined seek profile based on a current operating temperature.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, the embodiments described above where described in the context of a disc drive but the present invention is not so limited. Embodiments of the present invention are equally applicable to other data storage devices such as rotating disc optical storage devices, rotating disc magneto-optical devices, and data storage devices with removable storage media. In addition, the embodiments described above are primarily directed at temperature monitoring and control of the disc drive power device. However, the methods and apparatuses could also be applied to temperature control of any internal devices as measured at any location. Numerous other changes may be made which will readily suggest themselves to those skilled in the art and which are encompassed in the spirit of the invention disclosed and as defined in the appended claims.

What is claimed is:

1. A method of compensating a pre-defined seek profile for use in a data storage device, the method comprising:
 defining an operating temperature threshold in the data storage device;
 performing one or more seek operations at each of a plurality of initial data storage device operating temperatures; and
 obtaining a seek profile compensation value for each of the plurality of initial data storage device operating temperatures sufficient to maintain the data storage device operating temperature below the operating temperature threshold.

2. The method of claim 1 further comprising:
 determining a seek profile compensation function as a function of initial data storage device operating temperature based on the seek profile compensation values obtained.

3. The method of claim 2, wherein the determining operation comprises:
 fitting the plurality of seek profile compensation values and the plurality of initial data storage device operating temperatures to a curve.

4. The method of claim 3, wherein the fitting operation comprises:
 calculating variables for use in a mathematical formula defining the curve.

5. The method of claim 4 further comprising:
 storing the variables calculated in the fitting operation in the data storage device.

6. The method of claim 2, wherein the determining operation comprises:
 storing the seek profile compensation values for each of the plurality of initial data storage device operating temperatures in a table; and
 determining the seek profile compensation function as a linear interpolation between the seek profile compensation values for each of the plurality of initial data storage device operating temperatures in the table.

7. The method of claim 1 further comprising:
 determining a first seek profile compensation value for use when the initial data storage device operating temperatures is within a first operating temperature range, the first seek profile compensation value being sufficient to maintain the data storage device operating temperature below the operating temperature threshold;
 determining a second seek profile compensation value for use when the initial data storage device operating temperature is within a second operating temperature range, the second seek profile compensation value being sufficient to maintain the data storage device operating temperature below the operating temperature threshold; and
 determining a seek profile compensation function to be the first seek profile compensation value when the initial data storage device operating temperature is within the first operating temperature range and the second seek profile compensation value when the operating temperature is within the second operating temperature range.

8. The method of claim 7, wherein the first operating temperature range and the second operating temperature range overlap and the determining the seek profile compensation function operation comprises:
 if the initial data storage device operating temperatures is within the first operating temperature range and the second operating temperature range, determining the seek profile compensation function to be the first seek profile compensation value if the operating temperature is increasing and the second seek profile compensation value when the operating temperature is decreasing.

9. The method of claim 7 further comprising:
 storing the first seek profile compensation value, the first operating temperature range, the second seek profile compensation value, and the second operating temperature range in a seek profile compensation table in the data storage device.

10. The method of claim 1, wherein each seek operation includes performing seeks at a plurality of different seek lengths and the obtaining operation comprises:
 compensating the pre-defined seek profile to obtain a seek profile compensation value for each of the plurality of initial data storage device operating temperatures and each of the plurality of different seek lengths sufficient to maintain the operating temperature below the operating temperature threshold.

11. The method of claim 10 further comprising:
 determining a seek profile compensation function as a function of initial data storage device operating temperature and seek length based on the seek profile compensation value determined for each of the plurality of initial data storage device operating temperatures and each of the plurality of different seek lengths.

12. The method of claim 11, wherein the determining operation comprises:
fitting the plurality of seek profile compensation values, the plurality of initial data storage device operating temperatures and the plurality of different seek lengths to a curve by calculating variables for use in a mathematical formula defining the surface.

13. The method of claim 12 further comprising:
storing the variables calculated in the fitting operation in the data storage device.

14. The method of claim 10 further comprising:
storing the seek profile compensation values for each of the plurality of initial data storage device operating temperatures and each of the different seek lengths in a table; and
determining the seek profile compensation function as the linear interpolation between the seek profile compensation values for each of the plurality of initial data storage device operating temperatures in the table and the plurality of different seek lengths.

15. A method of performing a seek operation in a data storage device comprising:
determining seek profile compensation information corresponding to a plurality of initial data storage device operating temperatures sufficient to maintain the data storage device operating temperature below an operating temperature threshold;
determining a seek profile compensation value from the seek profile compensation information based on a current operating temperature;
compensating a pre-determined seek profile using the seek profile compensation value to create a temperature compensated seek profile; and
performing the seek operation using the temperature compensated seek profile.

16. The method of claim 15, wherein the seek operation has a seek length and the determining operation comprises:
determining a seek profile compensation value from seek profile compensation. information based on the current operating temperature and the seek length of the seek operation.

17. The method of claim 15, wherein the determining operation comprises:
monitoring recent changes in operating temperature; and
determining a seek profile compensation value by selecting a first seek profile compensation value from a table of a plurality of seek profile compensation values and associated operating temperature ranges based on the current operating temperature and the recent changes in operating temperature.

18. The method of claim 15, wherein the compensating operation comprises:
determining a second compensation value that is not based on operating temperature;
comparing the seek profile compensation value with the second compensation value to determine which is a most compensating profile compensation value; and
compensating the pre-determined seek profile using the most compensating profile compensation value to create a temperature compensated seek profile.

19. A controller for a data storage device comprising:
a microprocessor; and
a means for compensating a pre-determined seek profile based on a current operating temperature.

20. The controller of claim 19 where in the means for compensating comprises:
a means for compensating a pre-determined seek profile based on the current operating temperature and a seek length.

21. The controller of claim 19, wherein the data storage device comprises one of a magnetic disc drive, an optical disc drive, a magneto-optical disc drive, or a compact disc drive.

22. A device, comprising:
a controller that determines a seek profile compensation value for each of a plurality of initial data storage device operating temperatures sufficient to maintain the data storage device operating temperature below the operating temperature threshold.

23. The device of claim 22, wherein the controller compensates a pre-defined seek profile with the determined seek profile compensation values.

24. The device of claim 22, wherein the controller further determines a seek profile compensation function as a function of initial data storage device operating temperature based on the seek profile compensation values obtained.

25. The device of claim 22, wherein the controller further:
determines a first seek profile compensation value for use when the initial data storage device operating temperatures is within a first operating temperature range;
determines a second seek profile compensation value for use when the initial data storage device operating temperature is within a second operating temperature range; and
determines a seek profile compensation function to be the first seek profile compensation value when the initial data storage device operating temperature is within the first operating temperature range and the second seek profile compensation value when the operating temperature is within the second operating temperature range.

26. The device of claim 22, wherein the controller determines a seek profile compensation value for each of the plurality of initial data storage device operating temperatures and each of a plurality of different seek lengths sufficient to maintain the operating temperature below the operating temperature threshold.

27. The device of claim 22, wherein the data storage device comprises one of a magnetic disc drive, an optical disc drive, a magneto-optical disc drive, or a compact disc drive.

* * * * *